United States Patent [19]

Upmeier

[11] Patent Number: 4,809,413

[45] Date of Patent: Mar. 7, 1989

[54] APPARATUS FOR HELICALLY SLITTING A CONTINUOUS TUBULAR FILM OF SYNTHETIC THERMOPLASTIC MATERIAL

[75] Inventor: Hartmut Upmeier, Lengerich, Fed. Rep. of Germany

[73] Assignee: Windmoller & Holscher, Lengerich, Fed. Rep. of Germany

[21] Appl. No.: 38,170

[22] Filed: Apr. 14, 1987

[30] Foreign Application Priority Data

Apr. 14, 1986 [DE] Fed. Rep. of Germany ....... 3612497
May 16, 1986 [DE] Fed. Rep. of Germany ....... 3616666

[51] Int. Cl.$^4$ ............................................. B21D 43/02
[52] U.S. Cl. ..................................... 29/2.18; 29/2.14; 83/154
[58] Field of Search ................................ 29/2.1–2.25; 83/154; 242/56.2, 79, 65

[56] References Cited

U.S. PATENT DOCUMENTS

| 1,504,255 | 8/1924 | MacDonald | 29/2.12 X |
| 1,753,645 | 4/1930 | Camfield | 29/2.19 |
| 2,644,522 | 7/1953 | Parker et al. | 29/2.14 |
| 2,987,796 | 6/1961 | Evans et al. | 29/2.19 X |
| 3,161,942 | 12/1964 | Cheney | 29/2.14 X |
| 4,047,272 | 9/1977 | King et al. | 242/65 X |
| 4,165,052 | 8/1979 | Seibert | 242/79 X |

FOREIGN PATENT DOCUMENTS

| 109087 | 11/1939 | Australia | 29/2.16 |
| 782508 | 4/1968 | Canada . | |
| 1007500 | 10/1957 | Fed. Rep. of Germany . | |
| 2070660 | 9/1981 | United Kingdom . | |

Primary Examiner—Joseph M. Gorski
Attorney, Agent, or Firm—Fleit, Jacobson, Cohn & Price

[57] ABSTRACT

In an apparatus for helically slitting a continuous tubular film of synthetic thermoplastic material, a pair of feed rollers for feeding flattened continuous tubular film to a mandrel are mounted at fixed locations in a main frame. A rotary support mounted in the main frame carries the mandrel which consists of spaced apart low-friction bars disposed in a circular array concentric to the axis of rotation of the rotary support. A cutter is adapted to slit the tubular film as it traverses the mandrel. The axis of rotation of the support is aligned with the nip between the feed rollers approximately at the center of their length. A reversing rod and a deflecting or guide roller are connected to the rotary support for guiding the slit film from the mandrel to a winder. The winder has a winding axis aligned with or intersecting the axis of rotation of the rotary support at a right angle. A spreader for opening out the film is disposed between the feed rollers and the mandrel. The apparatus may be disposed vertically or horizontally.

20 Claims, 11 Drawing Sheets

APPARATUS FOR HELICALLY SLITTING A CONTINUOUS TUBULAR FILM OF SYNTHETIC THERMOPLASTIC MATERIAL

FIELD OF THE INVENTION

This invention relates to apparatus for helically slitting a continuous tubular film of synthetic thermoplastic material, preferably in the manufacture of stretched flat film webs having biaxial molecular orientation. The apparatus may, for example, be of the type comprising spreader means for opening out a continuously advancing tubular film to a cylindrical shape, means for advancing the opened out tubular film, a cutter for slitting the opened out tubular film along a helix, means for pulling the continuous flat film formed by the slitting cutter from the opened out portion of the tubular film, and a winder for winding up the continuous flat film so as to form a supply roll.

DESCRIPTION OF THE PRIOR ART

Apparatus of the kind for helically slitting stretched continuous tubular films of synthetic thermoplastic material, e.g., in the manufacture of laminates having crossing layers, are known, e.g., from Canadian Patent Specification 782,508 and German Patent Specification No. 10 07 500.

SUMMARY OF THE INVENTION

It is an object of the invention to provide an apparatus by which a stretched, flattened continuous tubular film of synthetic thermoplastic material can be converted at a high production rate to a supply roll consisting of a continuous flat film which has been lit along a helix from the continuous tubular film.

In an apparatus of the kind previously referred to, the object may be accomplished in accordance with the invention in that a pair of feed rollers for feeding the flattened continuous tubular film are mounted at fixed locations in a main frame, a rotary frame or a mounting plate or another rotary support, which is operatively connected to a rotary drive, is rotatably mounted in the main frame or the like and carries a backing mandrel; the mandrel consists of spaced apart backing elements, such as low-friction bars, which constitute an array concentric to the axis of rotation of the rotary support; the cutter is adapted to slit the tubular film in the region in which the film traverses the backing elements; the axis of rotation of the rotary support is aligned with the nip between the pair of feed rollers and extends through said nip approximately at the center of its length; at least one reversing rod and one deflecting or guide roller, or two reversing rods are non-rotatably connected to the rotary support and ar contacted by the continuous flat film moving to the winder; and the winding axis defined by the winder is axially aligned with or intersects at right angles the axis of rotation of the rotary support.

In apparatus in accordance with the invention, a continuous flat film strip which has been severed on a helix from a cylindrically opened out, continuous tubular film can be conveniently wound up to form supply rolls at a high production rate. The opened out portion of the continuous tubular film is pulled in an axial direction onto the receiving end of the backing mandrel and is slit by the cutter, which is suitably moved in the cutting direction into contact with the tubular film. The film is slit along a helix to form a continuous flat film. The cutter is carried by the backing mandrel, which during the cutting operation rotates relative to the tubular film portion which has been axially pulled onto the backing mandrel. To minimize friction between the tubular film and the backing mandrel, the latter consists of backing elements, such as bars having a low-friction surface. Friction can be further reduced in that the backing mandrel is provided on its outer surface, specifically the outer surfaces of the backing elements, with air nozzles for discharging air outwardly and reducing friction between the mandrel and the film.

The combination of the reversing rod and the deflecting roller, or the two reversing rods, which are non-rotatably connected to the rotary support, guides the continuous flat slit film to the winder. The tubular film portion that has been opened out to cylindrical shape is backed and rotated by the backing mandrel, which can be rotated at high speed because the winding axis of the winder coincides with the axis of rotation of the mandrel so that the centrifugal forces developed by rotation of the winder will not give rise to any substantial rotary unbalance even when the winder rotates at high speed. If the axis of rotation of the rotary support intersects the winding axis of the winder the latter must be non-rotatably connected to the rotary support. Rotation of the winder about a transverse axis will not be required if the winding axis of the winding means is axially aligned with the axis of rotation of the rotary support.

For satisfactory operation of the apparatus, the tubular film should be opened out without the formation of wrinkles or creases. Further, the film should be helically slit without being distorted. To this end, it is also contemplated within the scope of the invention that the spreader means for opening out the film comprises backing plates, which are mounted in the main frame and converge toward the nip of the feed rollers to constitute a wedge-shaped assembly symmetrical with respect to a center plane of the nip. An air-discharge tube may be secured to the rotary support, with the backing elements of the mandrel surrounding the tube. The tube preferably protrudes beyond the backing elements and communicates with a fan mounted on the rotary support. The air discharge from the tube is directed to the space between the backing plates so that the film as it leaves the backing plate is inflated into a cylindrical shape. The pulling means for the flat helically slit film also serves to pull the tubular film onto the backing mandrel. The backing mandrel is rotated relative to the tubular film portion as the latter axially approaches the mandrel at its receiving end.

The axis of the air-discharge tube is suitably aligned with the axis of rotation of the rotary support.

To permit a quick adaptation of the apparatus to tubular films which differ in diameter, it is also contemplated within the scope of the invention that the low-friction bars are mounted on the rotary support so as to be radially extensible and retractable by equal amounts.

The production rate of the apparatus will be increased further if the cutter consists of motor-driven circular disc. The cutter holder is suitably secured to one of the backing elements of the backing mandrel s that the cutter will be radially moved in unison with said one backing element.

The winder may be mounted on a rotary frame, which is incorporated in the rotary support, and the winder may define a winding axis which is at right angles to the axis of rotation of the rotary support. The rotary support preferably carries a pair of pull-off rollers for pulling the continuous flat film from the mandrel and the axes of the pull-off rollers may be parallel to the winding axis. A continuous flat film which is pulled-off only by the means for driving the winding shaft for the supply roll being wound might give rise to an excessively high tension in the film as it is wound.

Further, within the scope of the invention, it is contemplated that an oblique lower deflecting roller and an oblique upper reversing rod be disposed between the cutter and the pull-off rollers. The continuous flat film may be moved, in contact with the lower deflecting roller and the upper reversing rod, to the pull-off rollers. The reversing rod and the deflecting roller ensure that the pulled off film will be tensioned and will not wander as it moves to the winder. The pull-off rollers, which precede the winder, ensure that the film will be flat as it is delivered to the winder at right angles to the winding axis and under the desired tension. The functions of the reversing rod and of the deflecting roller are known per se from German Patent Specification No. 19 48 935. By means of the rotating deflecting roller, the film web is deflected in such a manner that the center lines of the incoming and outgoing portions of the film web lie in one plane. By means of non-rotating reversing rods, which are provided with low-friction coatings or coverings, the center lines of the incoming and outgoing portions of the film web will be angularly deflected so that said center lines will include equal and opposite angles with respect to the axis of the reversing rod. It is also contemplated that two oblique reversing rods may be provided between the cutter and the pull-off rollers.

In order to permit the diameter of the backing mandrel to be adjusted quickly and in a simple manner, it is further contemplated that the upper and lower portions of the backing elements be linked to a centrally disposed carrier, which preferably consists of an air-discharge tube, by links which constitute toggle joints. Upper links connected to the backing elements are longitudinally extended beyond the hinges of the toggle joints and their extended inner ends are pivoted to a slidable ring, which is slidably mounted on and adapted to be fixed in position to the centrally disposed carrier. Corresponding hinges between the links at the upper and lower portions of each backing element are interconnected by constraining rods.

When the diameter of the backing mandrel is to be altered in adaptation to different tubular film diameters, any of the reversing rods and deflecting rollers must be adjusted in radial and axial directions relative to the axis of rotation of the rotary support. For this reason the reversing rod and any reflecting roller may be mounted on a frame, which is radially displaceable along tracks provided on the rotary support. In such an arrangement one reversing rod may be displaceable along tracks which are provided on the displaceable frame and are parallel to the axis of rotation of the rotary support. The cutter may also be guided for displacement in a direction parallel to the axis of the rotary support. The motion for adjusting the reversing rod and possibly for adjusting the cutter holder may be transmitted by linkages, rack-and-pinion mechanisms and/or rope pulleys and ropes or the like means, and may be derived from the movement of a slidable ring along the central carrier.

The rotary support may comprise a mounting plate, which is non-rotatably connected to the free end of a cagelike rotary frame. The frame may surround the backing elements of the mandrel and be mounted in the main frame by means of a rotatable ring for rotation about a horizontal axis. That portion of the mounting plate which is disposed opposite to the backing elements of the mandrel, is connected to a frame or carrier for the winter, and the frame or carrier for the winder is provided at one end with a stub shaft, which is rotatably mounted in a stand and non-rotatably connected to a gearmotor.

In a different embodiment of the invention the rotary support may comprise a mounting plate, which is carried by a cagelike rotary frame. The frame may surround the backing elements of the mandrel and be mounted by two spaced apart rotatable rings in the main frame for rotation about a horizontal axis. The rotary frame may be operatively connected to a rotary drive, with the winding shaft having an axis which is axially aligned with the axis of rotation of the rotary support. On that side of the mounting plate which is opposite to the backing elements of the mandrel, the winding shaft may be rotatably mounted in a frame. The removal of the completely wound supply roll from the winder may be facilitated if the winding shaft is adapted to be uncoupled from the associated drive, which is fixed to the main frame, and the shaft is rotatably mounted in a transversely movable carriage.

The drive of the winder suitably may comprise a motor which has a rotating magnetic field so that the continuous flat film will be wound under a predetermined tension without need for a special speed control.

DETAILED DESCRIPTION OF THE PREFERRED EMBODIMENTS

Illustrative embodiments of the invention will now be explained in detail with reference to the drawing. It is understood that like reference numbers ar used in the respective embodiments to denote like parts of the apparatus.

Figures 1, 2:
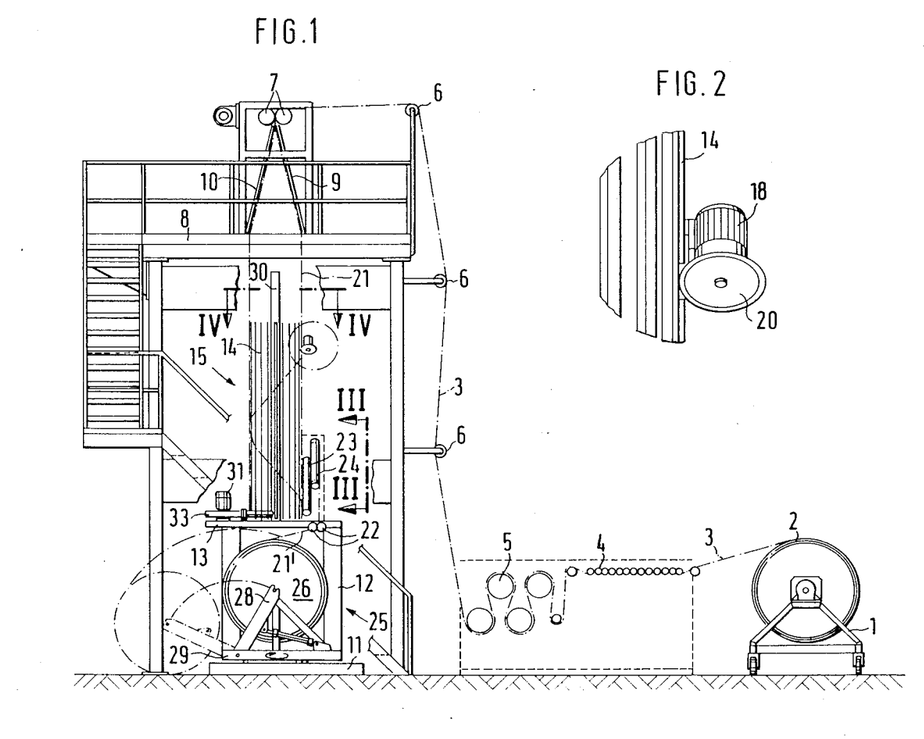
FIG. 1 is a diagrammatic side elevational view of a first embodiment apparatus for helically slitting a continuous tubular film, the apparatus including a stretching device preceding a slitting mechanism.
FIG. 2 is an enlarged elevational view of a circular disc, which constitutes a slitting cutter of the apparatus of FIG. 1.

FIG. 1 shows an apparatus in which a continuous tubular film is unwound from a supply roll, the unwound tubular film is stretched, the stretched tubular film is heat-set, the flat tubular film is opened out into a cylindrical shape, and the film is subsequently helically slit to form a continuous flat film, which is then wound into a roll.

Thus, as shown in FIG. 1, flattened continuous tubular film 3 is unwound from a supply roll 2, which is rotatably mounted in a wheeled frame 1. The tubular film is stretched in known manner between stretching rollers 4 of a stretching device. The stretched tubular film is then heat-set in contact with heated rollers 5. When the tubular film 3 has been stretched and heat-set, it moves, in contact with guide rollers 6, to the nip between a pair of feed rollers 7, which are rotatably mounted at the top end of a towerlike frame 8 and are operatively connected to a rotary drive. Beneath the feed rollers 7, backing plates 9, 10 constituting a spreader means are mounted in the towerlike frame 8 and converge toward each other and toward the nip between the feed rollers 7 in a wedgelike configuration having a center plane which coincides with the center plane of the nip between the feed rollers 7.

A rotary frame 12 is disposed below the backing plates 9, 10 and is rotatably mounted on a pedestal 11. The rotary frame 12 is operatively connected to a rotary drive and is rotatable about a vertical axis, which lies in the center plane of the nip between the feed rollers 7 and bisects the length of said nip. The rotary frame 12 is non-rotatably connected at its top end to a centrally disposed mounting plate 13. A backing mandrel 15, constituted by equally spaced apart low-friction bars 14, is supported on plate 13. The bars 14 are parallel to the axis of rotation of the rotary frame 12 and constitute an array which is centered on said axis of rotation.

One of the low-friction bars 14 has secured to it a carrier for a motor 18, which has a shaft, to which a circular cutter 20 is secured. The cutter serves to slit the continuous tubular film 3 between two of the low-friction bars 14 when the film 3 has been opened out between the backing plates 9, 10 to form a cylindrical tubular portion 21. The slitting results in the formation of a continuous flat film 21 which has a biaxial orientation depending on the slitting angle. The flat film 21 is pulled off by a pair of pull-off rollers 22, which are disposed below a slot in the mounting plate 13 through which the film passes. The flat film 21 is pulled by the pull-off rollers 22 to travel from the backing mandrel 15 around guide means comprising a deflecting roller 23 and a reversing rod 24 in alignment with a winding roll core of the winder 25. The film is thus delivered to the core and wound thereon to form a supply roll 26. The winder 25 is non-rotatably connected to the rotary frame 12 and is operatively connected to drive means, not shown, and which is also non-rotatably connected to the rotary frame 12. The winding axis of the winder 25 extends at right angles to and intersects the axis of rotation of the mounting plate 13. To facilitate removal of a completely wound supply roll 26 from the winder 25, the latter includes pivotally movable carriers 28, which carry the winding shaft or winding core and which are pivoted to a turntable 29, which constitutes a baseplate of the rotary frame 12.

A vertically extending centralized air-discharge tube 30 is secured to the mounting plate 13 and has an axis aligned with the axis of rotation of the rotary frame 12 and mandrel 15. The tube 30 is provided at its lower end with a connecting pipe, in which the outlet of a delivery duct from a fan 32 is fitted. The fan is also secured to the mounting plate 13 and is driven by a motor 31.

Figure 3:
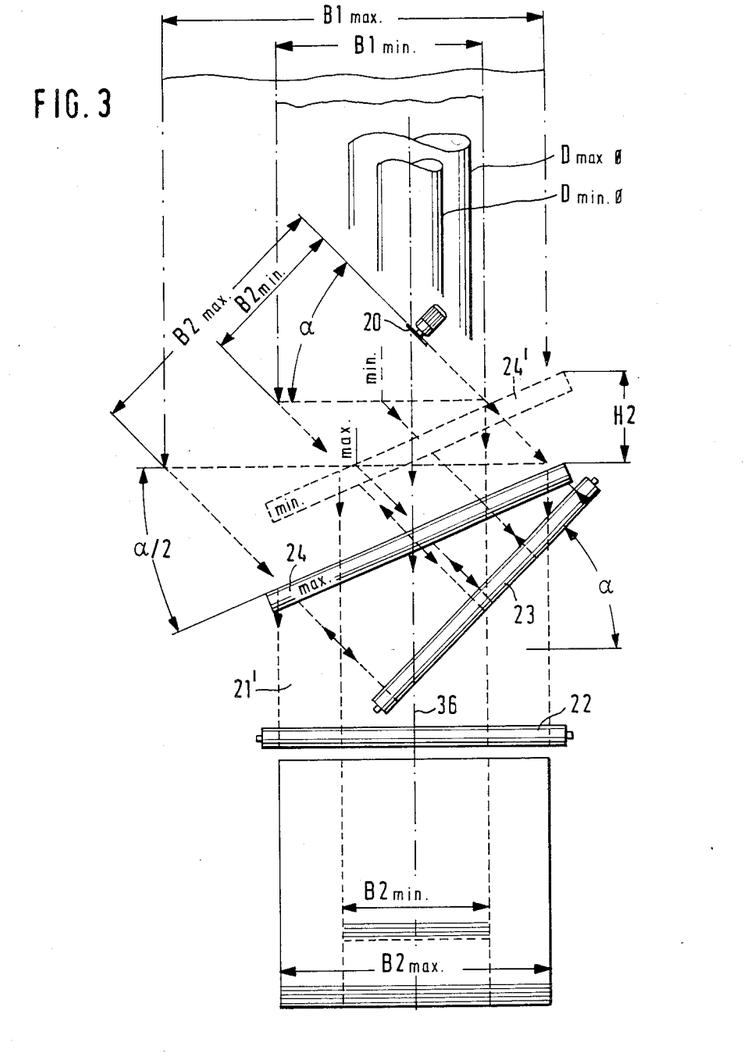
FIG. 3 is a diagrammatic view of a reversing rod and a deflecting roller for guiding continuous flat film which has been cut by the slitting cutter in the apparatus shown in FIG. 1.

FIG. 3 is an enlarged diagrammatic view showing the deflecting roller 23 and the reversing rod 24 as viewed in the direction of the arrows III in FIG. 1. In FIG. 3 the width B1Max equals the width of the widest flat film which is obtained when the widest tubular film that can be accommodated in the apparatus is slit in an axial direction. B1min equals the width of the continuous flat film which will be obtained when a tubular film having the smallest contemplated diameter Dmin is slit in an axial direction.

The slitting cutter 20 extends at an acute angle $\alpha$ to the axis of the tubular film. For this reason, flat films having smaller widths B2max and B2min, respectively, will be obtained when tubular films having the largest and smallest diameters, respectively, are slit.

From the slitting cutter 20 the continuous flat film moves around the deflecting roller 23, which is inclined at cutting angle $\alpha$ with the axis of rotation 36. From the deflecting roller 23, the flat film travels around the reversing rod 24 to the pull-off rollers 22.

The flat film 21 approaching the pull-off rollers 22 is aligned with the nip between said rollers 22 because the reversing rod 24 is inclined to the axis of rotation 36 at an angle $\alpha/2$.

It is apparent from FIG. 3 that for a change of the diameter of the tubular film from Dmax to Dmin the reversing rod 24 should be axially displaced by a distance H2. Further, the deflecting roller 23 and the reversing rod 24 should also be displaced in a radial direction to an extent corresponding to a change in diameter of the backing mandrel 15, which is necessary to accommodate the different diameter tubular films.

Figure 4:
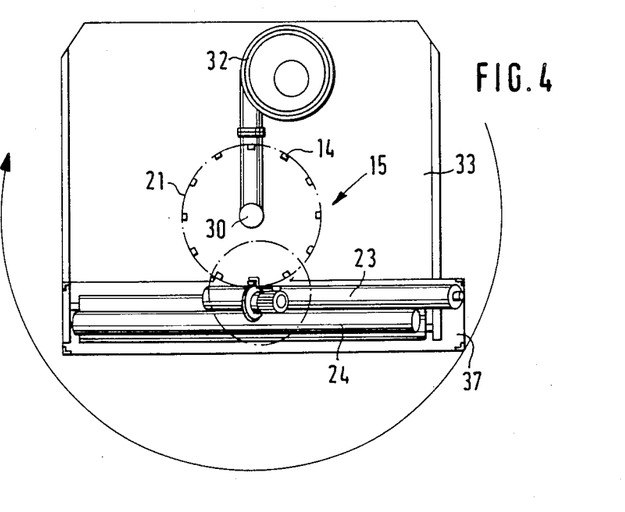
FIG. 4 is a plan view of the apparatus of FIG. 1 as viewed on the line IV—IV of FIG. 1.

In FIG. 4, the radial positions of the deflecting roller 23 and of the reversing rod 24 relative to the backing mandrel 15 are shown in plan view. The deflecting roller 23 and the reversing rod 24 are movably mounted in a displaceable frame 37 supported o the mounting plate 33 and displaceable thereon in a radial direction relative to the backing mandrel 15.

Figure 5:
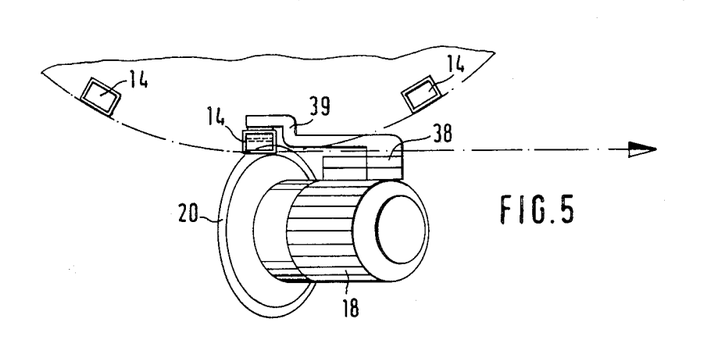
FIG. 5 is a plan view of the slitting cutter of the apparatus of FIG. 1.

FIG. 5 is an enlarged view, which illustrates the mounting of a carrier 38 for the motor 18 for driving the cutter 20. An angled bracket 39 is secured to the carrier 38 and may be movably mounted on one of the low-friction bars 14 by means of a slidable ring (not shown), which is adjustable in height in dependence on the change of the diameter of the backing mandrel 15 and can be clamped in position to the low-friction bar 14.

Figure 6:
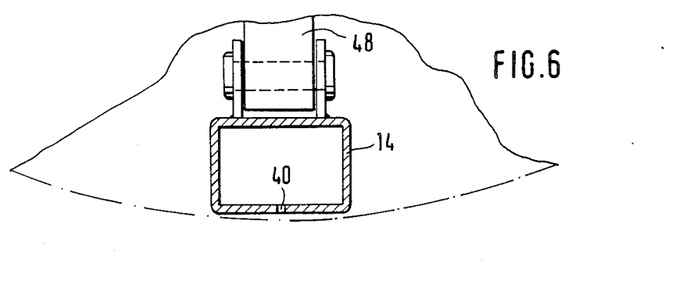
FIG. 6 is an enlarged sectional plane view through one of the mandrel bars.

As is apparent from FIG. 6, the low-friction bars 14 consist of box sections and the interior of each of the bars is supplied with compressed air. The low-friction bars 14 are formed at their radially outer surfaces with bores 40, which constitute air-blasting nozzles for reducing the friction. The compressed air may, for example, be supplied to a suitable manifold (not shown) from which the bars 14 extend and the air may be obtained from a fan or the like in similar manner as the supply of air to tube 30.

Figure 7:
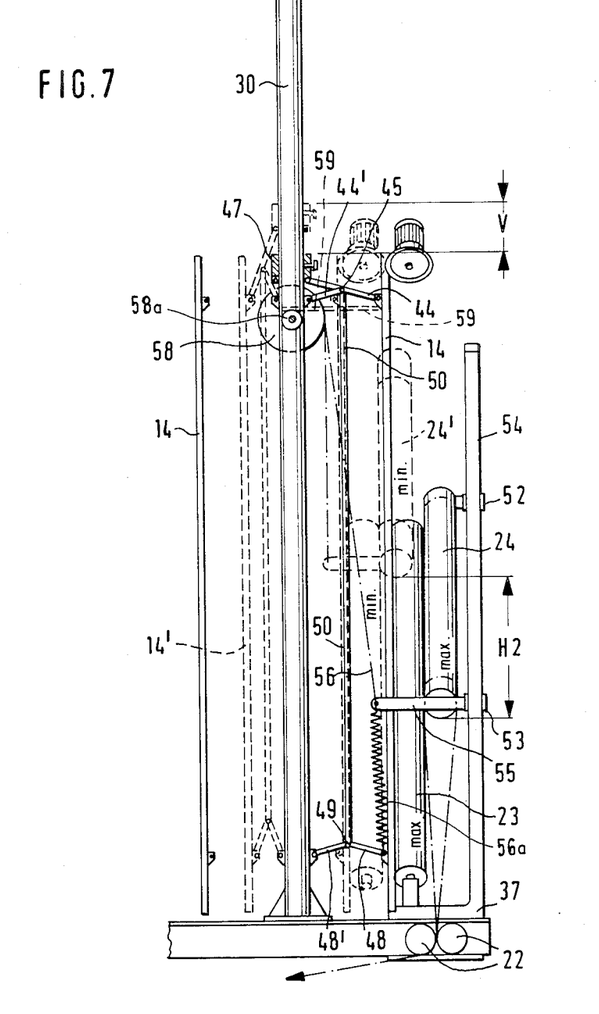
FIG. 7 is a view similar to FIG. 1 showing the apparatus with a backing mandrel adjusted to different diameters.

In FIG. 7, the low-friction bars 14 are shown by solid lines in their outermost radial position and by dotted lines 14' in their innermost radial position. Each low-friction bar 14 is movable between its innermost and outermost positions by means of pairs of links 44, 44' and 48, 48'. The links 44, 44' are connected by a hinge 45 to constitute a toggle joint. Each of said links 44, 44' has an outer end, which is pivoted to the upper portion of one of the low-friction bars 14, and an inner end, which is pivoted to the centrally disposed air-discharge tube 30. Each link 44 is, moreover, extended in length beyond the hinge 45 and its inner end is pivoted to a slidable ring 47. The lower portion of each low-friction bar 14 is similarly linked to tube 30 by the links 48, 48', which also constitute a toggle joint. Each hinge 49 of one of the lower toggle joints is linked by a constraining rod 50 to the hinge 45 of the corresponding upper toggle joint. With this arrangement, the low-friction bars can be adjusted in a radial direction relative to the tube 30 by axial displacement of the slidable ring 47, which is clamped to the air-blasting tube 30 in the required position by a set screw or the like.

When the low-friction bars 14 are radially adjusted, the reversing rod 24 must be adjusted in height to a corresponding extent. To provide such adjustment, the reversing rod 24 extends through and is axially guided by low-friction bushings 52, 53, which are mounted on vertical bars 54 of the displaceable frame 37. For displacement of the reversing rod, the low-friction bushings are connected to an arm 55, which is adapted to be raised and lowered under the control of a rope 56, which is wound on a rope drum 58. The drum 58 is rotatably mounted on a horizontal axle, which is secured to the air-discharge tube 30. For driving the rope drum 58, a gear 58a is secured to the drum 58 in mesh with a horizontal rack 59, which is connected to one of the low-friction bars 14. The adjusting mechanism is so designed that a displacement of the low-friction bars from the outermost position to the innermost position 14' will cause the reversing rod 24 to be raised from the position shown in solid lines by a distance H2 to the position 24' indicated by dotted lines.

The inwardly protruding end of bar 55 is connected by a tension spring 56a to that portion of a link 48 which is pivoted to the low-friction bar 14. That tension spring tends to pull the reversing rod 24 to its lower position.

For displacement of the reversing rod 24 and deflecting roller 23 in the radial direction, the base of movable frame 37 may, for example, be connected to one of the bars 14.

Figure 8:
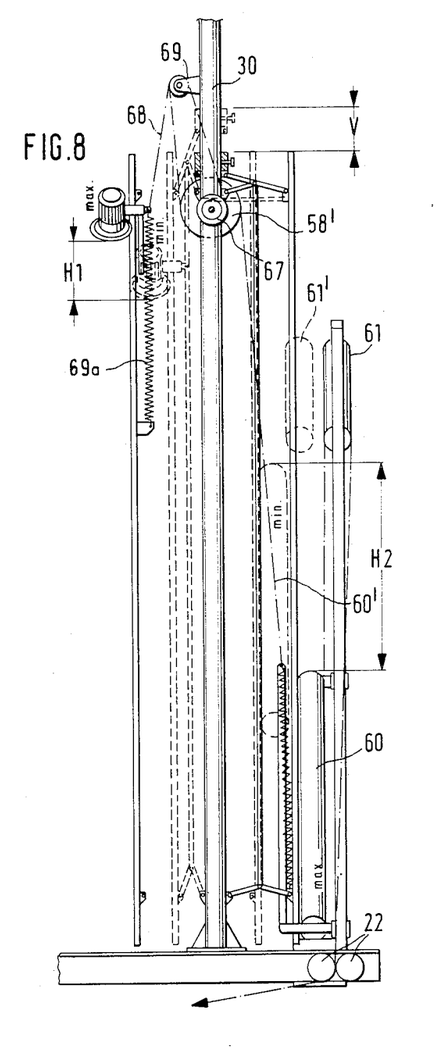
FIG. 8 is a view similar to FIG. 7 showing an embodiment with two reversing rods.

The embodiment shown in FIG. 8 includes two reversing rods 60, 61. When the low-friction bars 14 are moved from their outermost position to the innermost one, the lower reversing rod 60 must be radially displaced and must be raised in an axial direction by the distance H2 to the position 60' indicated by dotted lines. This is particularly clearly apparent from FIG. 9, which shows the reversing rods of FIG. 8 in a top plan view.

Figure 9:
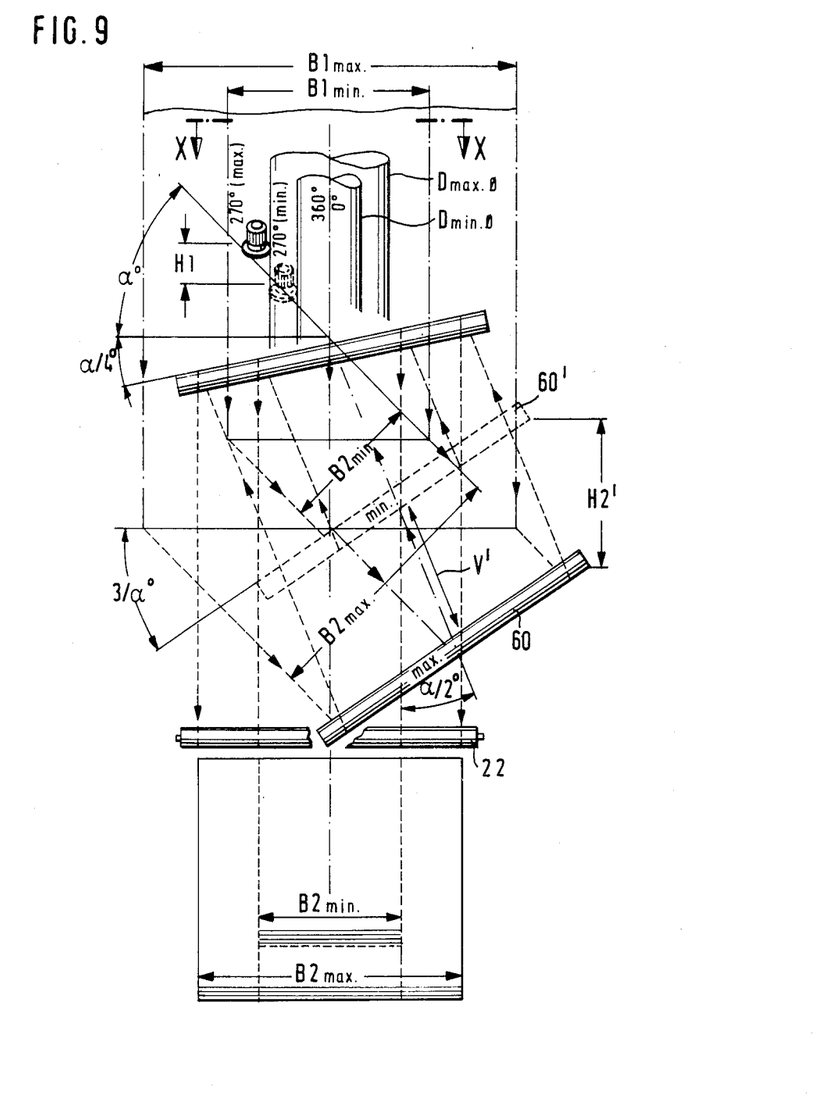
FIG. 9 is a diagrammatic view showing the course of a continuous flat film formed by slitting as it moves around two reversing rods in an apparatus as shown in FIG. 8.

In a view which is similar to FIG. 3, it is apparent also from FIG. 9 how the arrangement is changed in case of an alteration from the largest possible diameter of the tubular film to the smallest possible diameter thereof.

The embodiment shown in FIG. 8 comprises also a tension spring, which tends to hold the reversing rod 60 in its lower position.

Figure 10:
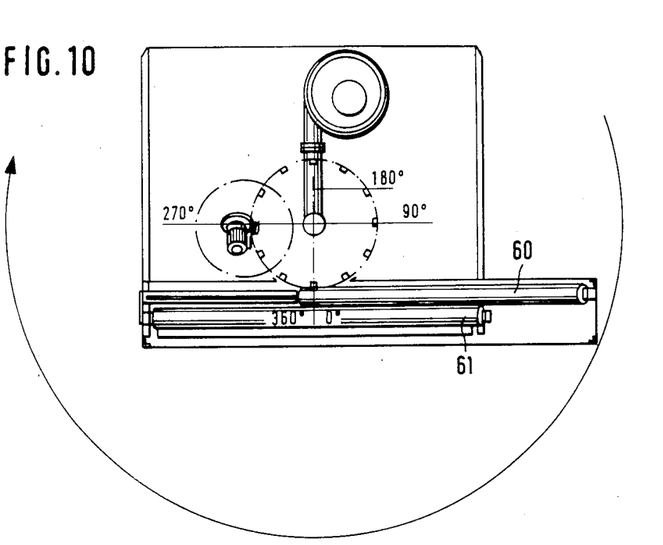
FIG. 10 is an enlarged plan view of the apparatus shown in FIG. 8.
Figure 11:
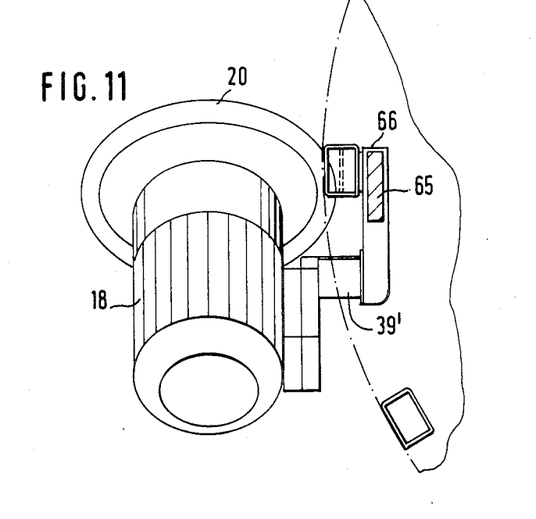
FIG. 11 is a plan view showing the cutter of the apparatus of FIG. 8.

FIG. 10 is a top plan view showing the embodiment of FIG. 8. In the embodiment of FIG. 8 the circular cutter 20 must also be axially displaceable. For this reason profiled track 65 is additionally provided on one of the bars 14 and extends through a low-friction bushing 66, which is secured to the carrier 39' which carries the baseplate of the motor 18. For an adjustment of the motor in height, a rope drum 67 (FIG. 8) is provided, which is smaller than the rope drum 58' and is coaxial with and non-rotatably connected to the latter. A rope 68 for lifting and lowering the cutting device 18, 20 is wound up on the smaller rope drum 67 and is trained around a deflecting sheave 69, which is freely rotatably mounted on the centrally disposed air-discharge tube 30. A spring 69a urges motor 18 to its lower-most position.

Figures 12, 13:
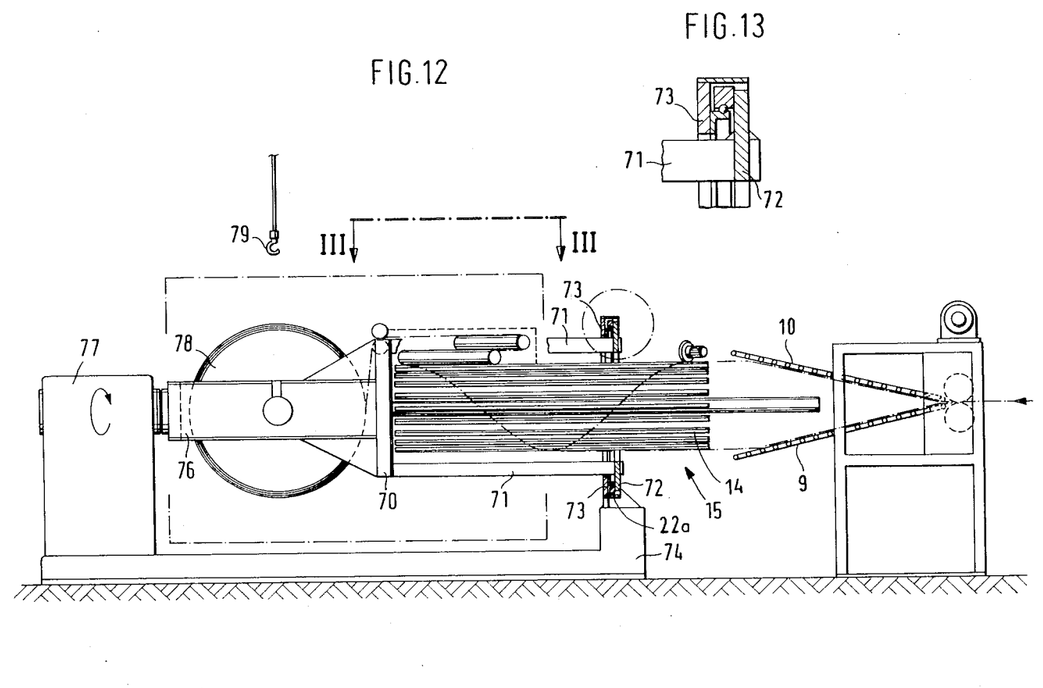
FIG. 12 is a side elevational view showing a third embodiment apparatus in which the mounting plate has a horizontal axis of rotation.
FIG. 13 is an enlarged sectional view showing the means for rotatably mounting the backing mandrel of FIG. 12.

In the embodiment shown in FIG. 12, a centrally disposed mounting plate 70 is mounted for rotation about a horizontal axis so that the entire apparatus has a horizontal orientation. Bars 71 which have parallel axes are connected to the mounting plate 70 and constitute a cage, which surrounds the backing mandrel 15, which consists of the low-friction bars 14. The bars 71 are connected at their outer ends to a ring 72. Ring 72 is rotatably mounted by means of a ball bearing 72a on a ring 73, which is secured to the main frame 74.

The mounting plate 70 is connected on its rear to a rotary frame 76, which is provided at its rear end with a stub shaft (not shown) The stub shaft is rotatably mounted in a vertical portion of the main frame 77 and is driven by a gearmotor. A winder and associated drive unit similar to the previous embodiments ar mounted in the rotary frame 76. A completely wound supply roll 78 consisting of the continuous flat film can be lifted by means of a crane hook 79 out of the winder when the latter has been properly aligned.

Figure 14:
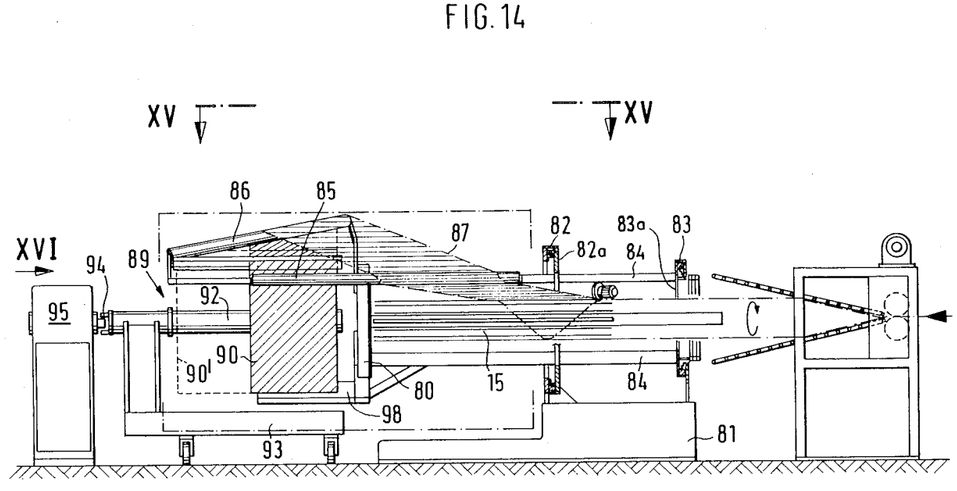
FIG. 14 is a diagrammatic side elevational view showing a horizontal apparatus for helically slitting continuous tubular films.
Figure 15:
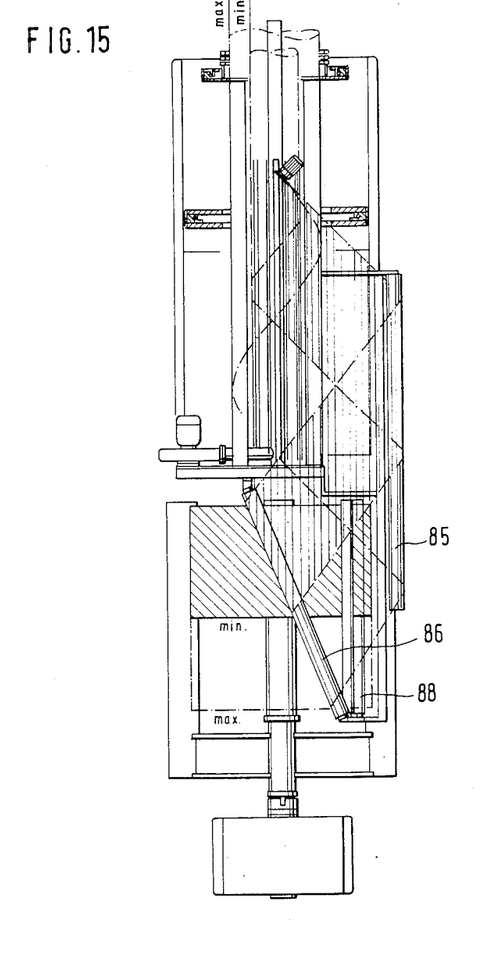
FIG. 15 is a plan view of the apparatus shown in FIG. 14.
Figure 16:
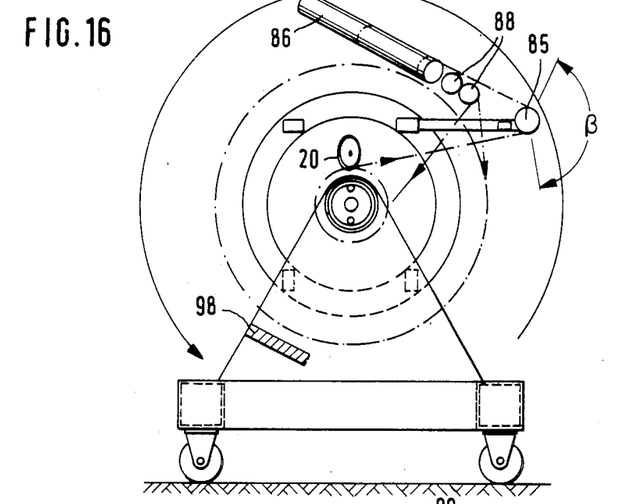
FIG. 16 is a front elevational view of the apparatus shown in FIGS. 14 and 15.

In the embodiment shown in FIGS. 14, 15 and 16, the backing mandrel 15 is connected at its forward end to a mounting plate 80 and is supported in a main frame 81 by means of two ring assemblies 82, 83, each with an inner and outer ring, whereas the mandrel 15 protrudes freely to the rear. The inner ring 82a, 83a of each of the assemblies 82, 83 is secured to an associated carrying cage 84. The two cages 84 are non-rotatably connected to the mounting plate 80. The inner ring 82a of the ring assembly 82 is provided with a gear, not shown, that meshes with a motor-driven pinion for driving the backing mandrel 15 and the mounting plate 80. Reversing rods 85, 86 are connected to and protrude rearwardly from the mounting plate 80. A continuous flat film 87 which has been obtained by the helical slitting of the continuous tubular film is pulled by a pair of pull-off rollers 88 to travel around the reversing rods 85, 86 and is subsequently delivered to the winder 89 and is wound up thereon to form a supply roll 90. FIGS. 14 and 15 illustrate the helical slitting of a continuous tubular film which has the smallest diameter that is contemplated. When a continuous tubular film is to be slit which has the largest contemplated diameter, the supply roll will have the width that is indicated by dotted lines 90'.

The winding shaft 92 is rotatably mounted only at one end in a truck 93 by means of a journal, which is adapted to be non-rotatably connected by a clutch 94 to the output shaft of a motor or gearmotor mounted on a stand 95. When the clutch 94 has been disengaged, the truck 93 can be moved away from the apparatus so that the supply roll can be removed.

In the embodiment shown in FIGS. 14, 15 and 16, the axis of the winding shaft 92 is axially aligned with the axis of rotation of the backing mandrel 15 so that the winding shaft need perform only the winding motion. Rotation of the shaft about a transverse axis is not required.

It is apparent from FIG. 16 how the continuous flat film travels from the slitting cutter 20 around the first reversing rod 85, the second reversing rod 86 and between the pull-off rollers 88 onto the winding core or the supply roll being formed. On the side which is opposite to the reversing rods, the rotary support is provided with a counterweight 98 for compensating any rotary unbalance which may be due to the reversing rods.

Figure 17:
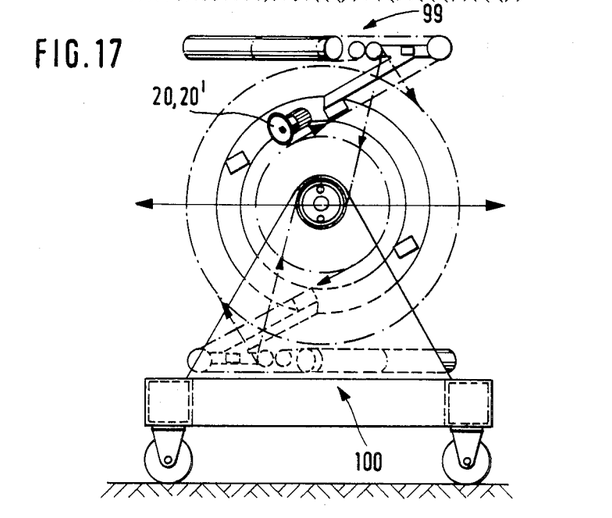
FIG. 17 a modified apparatus, which comprises two cutters and two winding stations, arranged one behind the other with axially aligned winding axes.

The embodiment shown in FIG. 17 comprises two slitting cutters 20, 20', which are arranged one behind the other in an axial direction and slit the continuous tubular film into two parallel continuous flat films. The first continuous flat film travels around the reversing rod and pull-off roller system 99 to an associated winding core. The second continuous flat film travels through the reversing rod and pull-off roller system 100 to a second winder, which defines a winding axis that is axially aligned with the winding axis defined by first winder. Both winding axes are axially aligned with the axis of rotation of the backing mandrel 15.

What is claimed is:

1. Apparatus for continuously helically slitting a tubular film into a substantially flat strip and winding the strip into a roll comprising a main frame, feed rollers on the main frame for receiving the tubular film in flattened form from a film supply and delivering the film to spreader means, spreader means for opening up the film received from the feed rollers into tubular form, a rotary support means on the main frame drive means for rotating the rotary support means, a rotary mandrel on the support means for receiving the opened out film, the mandrel comprising spaced elongated elements arranged in a tubular array, the mandrel and rotary support means having coaxial axes of rotation, said axes extending substantially in a plane defining a nip between the feed rollers at a location which is substantially centered lengthwise of the feed rollers, a cutter associated with the mandrel for rotation therewith and for helically slitting the tubular film into a strip as it traverses the mandrel, a winder adjacent the rotary support means at one end of the mandrel for rotation with the mandrel and for winding the strip into roll form, angled guide means on the rotary support means for receiving the strip from the mandrel and directing same to the winder, and pulling means on the support means for pulling the strip off the mandrel and through the guide means.

2. Apparatus as defined in claim 1 wherein the guide means comprises at least two guide elements selected from a group consisting of guide rollers and reversing rods.

3. Apparatus as defined in claim 1 wherein the winder has a winding axis coaxial with said axes of rotation.

4. Apparatus as defined in claim 1 wherein the winder has a winding axis perpendicular to said axes of rotation.

5. Apparatus as defined in claim 1 wherein the spreader means for opening up the film comprises backing plates mounted on the main frame, the backing plates converging toward the nip between the feed rollers in a wedge-shaped configuration.

6. Apparatus as defined in claim 5 wherein the backing plates are spaced from one end of the mandrel and the apparatus includes an air-discharge tube on the support means substantially coaxial therewith, the tube having a free air discharge end located between the mandrel and the backing plates.

7. Apparatus as defined in claim 1 including adjustment means for moving the elongate elements radially inwardly and outwardly to adjust the diameter of the mandrel.

8. Apparatus as defined in claim 7 wherein the adjustment means comprises a tube means coaxial with the mandrel, ring means on the tube means, and toggle linkage means between the elongate elements and the tube means for moving the elements radially responsive to axial movement of the ring means along the tube means.

9. Apparatus as defined in claim 8 wherein the tube means is an air-discharge tube for providing inflation air to a tubular film before it encounters the mandrel.

10. Apparatus as defined in claim 8 wherein the guide means is mounted on a movable frame on the support means, and the apparatus includes transmission means for moving the guide means radially and axially of the mandrel in concert with radial movement of the elongate elements.

11. Apparatus as defined in claim 10 including further transmission means for moving the cutter axially of the mandrel in concert with radial movements of the elongate elements.

12. Apparatus as defined in claim 1 wherein the cutter comprises a rotary disc-type cutter mounted on one of said elongate elements of the mandrel, the cutter having a disc adapted to be positioned at an angle corresponding to a lead angle at which the tubular film is to be helically slit.

13. Apparatus as defined in claim 1 wherein the winder is mounted for rotation with the rotary support means and has a winding axis perpendicular to said axes of rotation.

14. Apparatus as defined in claim 1 wherein the pulling means comprises a pair of pull-off rollers on the rotary support means, the pull-off rollers having axes parallel to a winding axis of the winder.

15. Apparatus as defined in claim 1 wherein said axes of rotation are substantially vertically oriented.

16. Apparatus as defined in claim 1 wherein said axes of rotation are substantially horizontally oriented.

17. Apparatus according to claim 1 wherein the elongate elements comprise air-discharge tubes with external air-discharge orifices for reducing friction between the mandrel and the tubular film.

18. Apparatus for continuously helically slitting a tubular film into a substantially flat strip and winding the strip into a roll comprising a main frame, feed rollers on the main frame for receiving the tubular film in flatted form from a film supply and delivering the film to spreader means, spreader means for opening up the film received from the feed rollers into tubular form, a rotary support means on the main frame, drive means for rotating the rotary support means, a rotary mandrel on the support means for receiving the opened out film, the mandrel comprising spaced elongate elements arranged in a tubular array, the mandrel and rotary support means having coaxial axes of rotation, said axes extending substantially in a plane defining a nip between the feed rollers at a location which is substantially centered lengthwise of the feed rollers, a cutter associated with the mandrel for rotation therewith and for helically slitting the tubular film into a strip as it traverses the mandrel, a winder adjacent the rotary support means at one end of the mandrel for rotation with the mandrel and for winding the strip into roll form, angled guide means on the rotary support means for receiving the strip from the mandrel and directing same to the winder, and pulling means on the support means for pulling the strip off the mandrel and through the guide means, wherein the rotary support means comprises a mounting plate, and the apparatus further includes a rotary frame, the rotary frame surrounding the elongate elements of the mandrel and being mounted by two spaced apart rotatable rings in the main frame for rotation about a horizontal axis, said rotary frame being operatively connected to a rotary drive, the winder having a shaft with an axis which is axially aligned with said axes of rotation, and on that side of the mounting plate which is opposite to the elongate elements of the mandrel, the winding shaft being rotatably mounted in a further frame.

19. Apparatus according to claim 18 wherein the winding shaft is adapted to be uncoupled from the associated drive, which is fixed to the main frame, and said shaft is rotatably mounted in a transversely movable carriage.

20. Apparatus for continuously helically slitting a tubular film into a substantially flat strip and winding the strip into a roll comprising a main frame, feed rollers on the main frame for receiving the tubular film in flattened form from a film supply and delivering the film to spreader means, spreader means for opening up the film received from the feed rollers into tubular form, a rotary support means on the main frame, drive means for rotating the rotary support means, a rotary mandrel on the support means for receiving the opened out film, the mandrel comprising spaced elongate elements arranged in a tubular array, the mandrel and rotary support means having coaxial axes of rotation, said axes extending substantially in a plane defining a nip between the feed rollers at a location which is substantially centered lengthwise of the feed rollers, a cutter associated with the mandrel for rotation therewith and for helically slitting the tubular film into a strip as it traverse the mandrel, a winder adjacent the rotary support means at one end of the mandrel for rotation with the mandrel and for winding the strip into roll form, angled guide means on the rotary support means for receiving the strip from the mandrel and directing same to the winder, and pulling means on the support means for pulling the strip off the mandrel and through the guide means, wherein said axes of rotation are substantially horizontally oriented, and wherein the rotary support means comprises a mounting plate, and the apparatus further includes a rotary frame on the mounting plate, said rotary frame surrounding the elongate elements of the mandrel and being mounted in the main frame by means of a rotatable ring for rotation about a horizontal axis, that portion of the mounting plated which is disposed on that side of the mounting plate that is opposite to the elongate elements of the mandrel being connected to a carrier for the winder, and said carrier for the winder being provided at one end with a stub shaft, which is rotatably mounted in a stand and non-rotatably connected to a motor.

* * * * *